(12) United States Patent
Hinkey, Jr. et al.

(10) Patent No.: US 12,151,225 B2
(45) Date of Patent: Nov. 26, 2024

(54) METHOD AND REACTOR FOR PRODUCING ONE OR MORE PRODUCTS

(71) Applicant: Ekona Power Inc., Burnaby (CA)

(72) Inventors: John Benjamin Hinkey, Jr., Seattle, WA (US); Timothy John Elder, Spokane, WA (US); Kenneth William Kratschmar, Vancouver (CA); Christopher Edwin John Reid, Vancouver (CA)

(73) Assignee: EKONA POWER INC., Burnaby (CA)

( * ) Notice: Subject to any disclaimer, the term of this patent is extended or adjusted under 35 U.S.C. 154(b) by 150 days.

(21) Appl. No.: 18/177,002

(22) Filed: Mar. 1, 2023

(65) Prior Publication Data

US 2023/0201790 A1    Jun. 29, 2023

Related U.S. Application Data

(63) Continuation of application No. 17/296,842, filed as application No. PCT/CA2019/051765 on Dec. 9, 2019, now Pat. No. 11,701,632.

(Continued)

(51) Int. Cl.
*B01J 19/24* (2006.01)
*B01J 19/00* (2006.01)

(52) U.S. Cl.
CPC .......... *B01J 19/24* (2013.01); *B01J 19/0013* (2013.01); *B01J 19/0053* (2013.01)

(58) Field of Classification Search
CPC ...... B01J 4/00–002; B01J 4/005; B01J 4/007; B01J 19/00; B01J 19/0006; B01J 19/0013; B01J 19/002; B01J 19/0026; B01J 19/0053; B01J 19/24; B01J 19/241; B01J 19/2415; B01J 19/2425; B01J 19/28; B01J 19/32; B01J 2219/00; B01J 2219/00049;

(Continued)

(56) References Cited

U.S. PATENT DOCUMENTS 4,123,220 A   10/1978   Bond et al.
5,190,739 A    3/1993   Mackay et al.

(Continued)

FOREIGN PATENT DOCUMENTS

CA    2379892 A1    2/2001
CA    2880075 A1    2/2014

(Continued)

OTHER PUBLICATIONS

Yang, Yichen Cui, and Ningsheng Cai, Research Progress in Hydrogen Production from Natural Gas Cracking, Journal of Solar Energy, vol. 27, No. 10, pp. 697-972; Oct. 1, 2006.

(Continued)

*Primary Examiner* — Natasha E Young
(74) *Attorney, Agent, or Firm* — D'Ambrosio & Menon, PLLC; Usha Menon

(57) ABSTRACT

A feedstock gas, such as natural gas, is introduced into a mixing chamber. A combustible gas is introduced into a combustion chamber, for example simultaneously to the introduction of the feedstock gas. Thereafter, the combustible gas is ignited so as to cause the combustible gas to flow into the mixing chamber via one or more fluid flow paths between the combustion chamber and the mixing chamber, and to mix with the feedstock gas. The mixing of the combustible gas with the feedstock gas causes one or more products to be produced.

20 Claims, 14 Drawing Sheets

Related U.S. Application Data

(60) Provisional application No. 62/777,619, filed on Dec. 10, 2018.

(58) Field of Classification Search
CPC ... B01J 2219/00051; B01J 2219/00157; C01B 3/00; C01B 3/02; C01B 3/22; C01B 3/24; C01B 2203/00; C01B 2203/02; C01B 2203/025; C01B 2203/0266; C01B 2203/04; C01B 2203/042; C01B 2203/043; C01B 2203/08; C01B 2203/0805; C01B 2203/0811; C01B 2203/0827; C01B 2203/12; C01B 2203/1205; C01B 2203/1211; C01B 2203/1235; C01B 2203/1241; H01M 8/00; H01M 8/06; H01M 8/0606; H01M 8/0612; H01M 8/0616; H01M 8/22; H01M 8/225
See application file for complete search history.

(56) References Cited

U.S. PATENT DOCUMENTS

| | | | |
|---|---|---|---|
| 5,300,216 A | 4/1994 | Hertzberg et al. |
| 5,864,517 A | 1/1999 | Hinkey et al. |
| 6,986,870 B1 | 1/2006 | Brandenburg |
| 7,537,623 B2 | 5/2009 | Etievant et al. |
| 8,721,980 B2 | 5/2014 | Peters |
| 9,084,978 B2 | 7/2015 | Peters |
| 9,187,335 B2 | 11/2015 | Peters |
| 9,359,200 B2 | 6/2016 | Maass et al. |
| 9,359,218 B2 | 6/2016 | Peters |
| 9,574,086 B2 | 2/2017 | Johnson et al. |
| 9,737,865 B2 | 8/2017 | Peters |
| 9,937,458 B2 | 4/2018 | Al-Dawood et al. |
| 10,618,026 B2 | 4/2020 | Taylor et al. |
| 11,020,719 B2 | 6/2021 | Pannala et al. |
| 11,149,148 B2 | 10/2021 | Taylor et al. |
| 11,203,692 B2 | 12/2021 | Hoermann et al. |
| 11,220,428 B2 | 1/2022 | Kielb |
| 2002/0039548 A1 | 4/2002 | Matsumura et al. |
| 2004/0166055 A1 | 8/2004 | Stickney et al. |
| 2005/0072152 A1 | 4/2005 | Suzuki et al. |
| 2008/0118413 A1 | 5/2008 | Lomax et al. |
| 2011/0283705 A1 | 11/2011 | Oliver |
| 2014/0127121 A1 | 5/2014 | Maass et al. |
| 2017/0058128 A1 | 3/2017 | Johnson et al. |
| 2018/0022925 A1 | 1/2018 | Hardman et al. |
| 2018/0215615 A1 | 8/2018 | Kielb |
| 2020/0239696 A1 | 7/2020 | Johnson et al. |
| 2021/0261417 A1 | 8/2021 | Cardinal et al. |

FOREIGN PATENT DOCUMENTS

| | | |
|---|---|---|
| CA | 3033943 A1 | 3/2017 |
| CN | 1245480 A | 2/2000 |
| CN | 1339014 A | 3/2002 |
| CN | 102583242 A | 7/2012 |
| CN | 104401942 B | 3/2015 |
| CN | 104540583 A | 4/2015 |
| CN | 106854127 A | 6/2017 |
| EP | 0119158 A1 | 9/1984 |
| EP | 1078020 B1 | 11/2003 |
| GB | 1467123 A | 3/1977 |
| JP | S59-168091 | 9/1984 |
| JP | 2003-027241 A | 1/2003 |
| JP | 2004-002186 A | 1/2004 |
| JP | 3844226 A | 2/2004 |
| JP | 2008531924 A | 8/2008 |
| JP | 2015209344 A | 11/2015 |
| JP | 2017-197399 A | 11/2017 |
| RU | 2195425 | 12/2002 |
| WO | 9911571 | 3/1999 |
| WO | 9958614 A1 | 11/1999 |
| WO | 2002062700 A3 | 8/2002 |
| WO | 2006108124 A2 | 10/2006 |
| WO | 2011022761 A1 | 3/2011 |
| WO | 2020118417 A1 | 6/2020 |

OTHER PUBLICATIONS

Kinetic model of homogeneous thermal decomposition of methane and ethane, Maryam Younessi-Sinaki, Edgar A. Matida, Feridun Hamdullahpur, Carleton University, Department of Mechanical and Aerospace Engineering, 1125 Colonel By Drive, Ottawa, On K1S 5B6, Canada. 2009.

Wave rotor design method with three steps including experimental validation, Chan Shining et al. Journal of Engineering for Gas Turbines and Power, Dec. 2017.

Zhang, C., Current status of stationary fuel cells for coal power generation, Clean Energy, Jul. 2018, vol. 2, pp. 126-139.

Abbas, HF et al. Hydrogen production by methane decomposition: A review. International Journal of Hydrogen Energy. Nov. 27, 2009, vol. 35, pp. 1160-1190.

METHOD AND REACTOR FOR PRODUCING ONE OR MORE PRODUCTS

CROSS REFERENCE TO RELATED APPLICATION(S)

This application is a continuation of U.S. patent application Ser. No. 17/296,842 filed on May 25, 2021, which is a U.S. National Stage entry of PCT/CA2019/051765, now WO 2020/118417, filed on Dec. 9, 2019, which claims priority to provisional Patent Application No. 62/777,619 filed on Dec. 10, 2018, the contents of which are incorporated by reference herein.

FIELD OF THE DISCLOSURE

The present disclosure relates to a method and associated reactor for producing one or more products, for example through cracking of a feedstock gas such as natural gas.

BACKGROUND TO THE DISCLOSURE

Chemical cracking of natural gas ($CH_4$) refers to the disassociation of the natural gas into its constituent components of carbon (C) and Hydrogen ($H_2$). Conventional methods of hydrogen generation such as steam methane reforming (SMR) result in significant dilute $CO_2$ emissions which may require costly post-reforming cleanup to sequester. As a result, SMR produces approximately 8-10 tonnes of $CO_2$ per tonne of $H_2$ produced. Adding $CO_2$ cleanup to SMR flue gas streams is generally cost prohibitive unless penalties for carbon dioxide emissions increase to a tipping point.

Other methods of thermal decomposition to produce hydrogen and solid carbon exist, such as thermal and liquid metal pyrolysis and plasma pyrolysis. These processes are generally tailored to maximize the production of solid carbon for associated carbon markets and are widely used in these industries.

Thermal cracking of natural gas is typically a constant-pressure, steady-flow process whereby natural gas is heated until it reaches the temperature required to begin the formation of hydrogen and carbon. At this point, the temperature is maintained for a certain time to complete the equilibrium reaction. As the temperature is increased, the time required for methane conversion decreases, assuming a constant pressure of 1 ATM (as shown in FIG. 1—drawing obtained from Kinetic model of homogeneous thermal decomposition of methane and ethane, Maryam Younessi-Sinaki, Edgar A. Matida, Feridun Hamdullahpur, Carleton University, Department of Mechanical and Aerospace Engineering, 1125 Colonel By Drive, Ottawa, ON K1S 5B6, Canada, the entirety of which is hereby incorporated by reference).

In such steady flow reactors, the carbon formed tends to build up on the surfaces of the reactor, eventually becoming so thick that the reactor performance is compromised. Mechanical scraping processes, or burning the carbon off the surfaces by introducing air into the reactor, are two common means of cleaning the reactor. Mechanical scraping is difficult to implement and may not be able to remove hard carbon deposits. Burning the carbon off with air creates significant $CO_2$ emissions which is undesirable. It is therefore highly desirable to not form carbon on the surfaces in the first place, and to send the produced carbon to downstream processes.

Furthermore, shorter reaction times are needed to reduce the size of the reactor, but this requires high temperatures and exotic materials which are very costly. To try and overcome this, catalysts are added to the reactor which have the effect of lowering the reaction temperature. However, carbon build-up now also occurs on the surface of the catalysts which deactivate over time and require a reactivation process, or are replaced. Both of these options are costly and add complexity to the process.

Liquid media reactors, such as liquid metal reactors, involve a thermal process whereby natural gas is bubbled through a column of high-temperature liquid, such as liquid metal or salts. As this is a constant-pressure, steady-flow process, the same temperature vs. time reaction rates as described above apply. The benefit of this process is that the separation of hydrogen and carbon is simplified as the produced hydrogen bubbles out of the top of the reactor column and the carbon floats to the surface of the liquid media where is can theoretically be skimmed away. In some examples, liquid metal alloys have been identified which provide a catalytic effect and lower the reaction temperature. In all cases, however, carbon build-up at the top of the reactor remains a problem, and the use of molten media adds complexity, materials challenges and cost to the reactor.

For most thermal processes, the energy required to heat the reactor and to maintain the process is usually supplied by burning some excess natural gas with air. This flue gas releases $CO_2$ into the atmosphere and contributes to global warming. In some cases, the excess carbon build-up and/or hydrogen can also be used to provide heat of reaction.

Plasma reactors pass natural gas at constant pressure through a high-temperature plasma which is created by electricity. Plasmas can be created by the use of, for example, electrodes or microwaves. In these reactors, carbon build-up can still be a problem but less so than thermal reactors as the high temperature plasma is confined to a very small area. Unlike thermal reactors, plasma reactors rely solely on electricity as the energy input. Compared to thermal systems, the cost of electricity for the input energy is much higher than that for natural gas, and therefore the resulting production cost of hydrogen and methane is much higher.

There is therefore a need in the art for a natural gas cracking process which uses thermal energy that has lower capital cost and that suffers less from carbon build-up issues.

SUMMARY OF THE DISCLOSURE

Generally, the present disclosure relates (but is not limited) to the cracking of natural gas into its components of carbon (C) and hydrogen ($H_2$), using dynamic gas compression and mixing to create the pressure and temperature needed to thermally decompose the natural gas. A goal of the process is to optimize the process for hydrogen yield and to recover solid carbon as a secondary value stream, while minimizing carbon greenhouse emissions. When paired with a direct carbon fuel cell (DCFC), the carbon product can be used to generate electricity and a pure product stream of $CO_2$ suitable for sequestration (see FIG. 2). The result is low-cost, "clean" hydrogen production.

According to a first aspect of the disclosure, there is provided a method of producing one or more products, comprising: introducing a feedstock gas into a mixing chamber, wherein the feedstock gas comprises one or more gases; introducing a combustible gas into a combustion chamber, wherein the combustible gas comprises one or more gases; and thereafter, igniting the combustible gas so as to cause the combustible gas to flow into the mixing chamber via one or more fluid flow paths between the combustion chamber and the mixing chamber, and to mix with the feedstock gas, wherein energy is transferred from the combustible gas to the feedstock gas and thereby causes one or more products to be produced.

The introductions of the feedstock gas and the combustible gas may be such that the feedstock gas substantially does not mix, or undergoes very little or negligible mixing, with the combustible gas prior to the igniting.

The method may further comprise stopping further production of the one or more products.

The method may further comprise preheating the feedstock gas prior to introducing the feedstock gas into the mixing chamber.

The method may further comprise preheating the combustible gas prior to introducing the combustible gas into the combustion chamber.

A ratio of a volume of the mixing chamber to a volume of the combustion chamber may be less than or equal to about 10:1.

A ratio of a length of the mixing chamber to a diameter of the mixing chamber may be less than or equal to about 30:1.

The feedstock gas may comprise natural gas. The feedstock gas may comprise a mixture of natural gas and recycled gas. The recycled gas may comprise one or more of: natural gas; hydrogen; carbon monoxide; and carbon dioxide.

The combustible gas may comprise an oxidant. The oxidant may comprise one or more of oxygen and air. The combustible gas may comprise a mixture of $CH_4$ and $O_2$. The combustible gas may comprise a mixture of recycled gas and the oxidant. The recycled gas may comprise one or more of: natural gas; hydrogen; carbon monoxide; and carbon dioxide.

The combustible gas may be introduced into the combustion chamber simultaneously to the introduction of the feedstock gas into the mixing chamber.

The combustible gas may be introduced into the combustion chamber at a pressure that is equal to a pressure with which the feedstock gas is introduced into the mixing chamber.

The one or more products may comprise one or more of hydrogen and carbon.

The one or more products may comprise one or more of hydrogen and carbon monoxide.

The one or more products may comprise one or more of hydrogen, nitrogen, and carbon. The hydrogen and nitrogen may be used for ammonia production.

Stopping further production of the one or more products may comprise reducing a pressure within the mixing chamber. The pressure within the mixing chamber may be reduced sufficiently rapidly, for example by at least 50% over less than 1 second, so as to inhibit carbon fouling of the mixing chamber.

A pressure wave generated by the combustion of the combustible gas may inhibit carbon fouling of the mixing chamber.

The energy may be transferred from the combustible gas to the feedstock gas via gas dynamic compression and mixing.

A temperature in the combustion chamber after ignition but before mixing of the combustible gas with the feedstock gas may be ~90 ATM and ~3,700 K, for example with pure $O_2$ as the oxidant and recycled gas as the combustible gas.

After the mixing of the combustible gas with the feedstock gas, and before the one or more products are produced, at least a portion of the mixture of the feedstock gas and the combustible gas may be transferred to a third chamber. Thus, the combustion chamber and mixing chamber may be replenished with fresh combustible gas and feedstock gas while a user waits for the one or more products to be produced in the third chamber.

In a further aspect of the disclosure, there is provided a feedstock gas reactor comprising: a mixing chamber; a combustion chamber; valving for controlling flow of gases into and out of the mixing chamber and the combustion chamber; an igniter; and one or more controllers configured to perform a method comprising: controlling the valving to introduce a feedstock gas into the mixing chamber, wherein the feedstock gas comprises one or more gases; controlling the valving to introduce a combustible gas into the combustion chamber, wherein the combustible gas comprises one or more gases; and thereafter, controlling the igniter to ignite the combustible gas so as to cause the combustible gas to flow into the mixing chamber via one or more fluid flow paths between the combustion chamber and the mixing chamber, and to mix with the feedstock gas, wherein energy is transferred from the combustible gas to the feedstock gas and thereby causes one or more products to be produced.

The introductions of the feedstock gas and the combustible gas may be such that the feedstock gas substantially does not mix with the combustible gas.

The method may further comprise controlling the valving to stop further production of the one or more products.

The combustion chamber may be located within the mixing chamber. The combustion chamber may be offset from a longitudinal axis of the mixing chamber.

The combustion chamber may be located outside the mixing chamber.

The combustion chamber may comprise one or more apertures formed therein.

The feedstock gas reactor may comprise any of the features described in connection with the first aspect of the disclosure.

In a further aspect of the disclosure, there is provided a feedstock gas reactor comprising: a mixing chamber; a combustion chamber comprising one or more apertures formed therein, wherein the one or more apertures provide one or more fluid flow paths from the combustion chamber to the mixing chamber; valving for controlling flow of gases into and out of the mixing chamber and the combustion chamber; and an igniter.

The feedstock gas reactor may comprise any of the features described in connection with the first aspect of the disclosure.

Controlling the valving may comprise controlling the opening and/or closing of individual valves. Alternatively, or in addition, controlling the valving may comprise rotating valves (for example using a motor) relative to the reactor.

In a further aspect of the disclosure, there is provided a system comprising: multiple feedstock reactors, each reactor comprising: a mixing chamber; a combustion chamber; and an igniter; valving for controlling flow of gases into and out of the mixing chambers and the combustion chambers; and one or more controllers configured to perform a method comprising, for each reactor: controlling the valving to introduce a feedstock gas into the mixing chamber, wherein the feedstock gas comprises one or more gases; controlling the valving to introduce a combustible gas into the combustion chamber, wherein the feedstock gas comprises one or more gases; and thereafter, controlling the igniter to ignite the combustible gas so as to cause the combustible gas to flow into the mixing chamber via one or more fluid flow paths between the combustion chamber and the mixing chamber, and to mix with the feedstock gas, wherein energy is transferred from the combustible gas to the feedstock gas and thereby causes one or more products to be produced, wherein, for a given reactor, the method is performed out of phase with at least one other reactor of the multiple reactors.

For each reactor, the introductions of the feedstock gas and the combustible gas may be such that the feedstock gas substantially does not mix with the combustible gas.

For each reactor, the method may further comprise controlling the valving to stop further production of the one or more products.

The multiple reactors may be arranged radially about a central axis, and the system may further comprise a rotator configured to: rotate the multiple reactors about the central axis relative to a valve assembly comprising the valving; or rotate a valve assembly comprising the valving about the central axis relative to the multiple reactors. Thus, the valve assembly may be rotated while the reactors are stationary, or the valve assembly may be stationary while the reactors are rotated. In some embodiments, the valve assembly and the reactors may even be rotated at the same time.

Controlling the valving may comprise controlling the opening and/or closing of individual valves. Alternatively, or in addition, controlling the valving may comprise rotating valves (for example using a motor) relative to the reactors.

The system may comprise any of the features described in connection with the first aspect of the disclosure.

In a further aspect of the disclosure, there is provided a system comprising: one or more of any of the above-described reactors; and one or more fuel cells coupled to the one or more reactors and configured to receive carbon produced from the mixing of the combustible gases with the feedstock gases.

The system may comprise any of the features described in connection with the first aspect of the disclosure.

BRIEF DESCRIPTION OF THE DRAWINGS

Embodiments of the disclosure will now be described in detail in conjunction with the accompanying drawings of which.

DETAILED DESCRIPTION OF EMBODIMENTS

The present disclosure seeks to provide an improved method and reactor for producing one or more products. While various embodiments of the disclosure are described below, the disclosure is not limited to these embodiments, and variations of these embodiments may well fall within the scope of the disclosure which is to be limited only by the appended claims.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

Generally, according to embodiments of the disclosure, there is described an ultra-rich pulsed pyrolysis process used to produce hydrogen-rich gas and/or carbon products from natural gas feedstock. For large-scale hydrogen production, the process could compete with SMR.

According to embodiments of the disclosure, there is described the use of an unsteady, constant volume pulsed reaction process to produce hydrogen and carbon products from a natural gas-based feedstock. A separate chamber of combustible gases and an oxidant provides the energy for the reaction, and is transferred directly to the feedstock mixing chamber by gas-dynamic compression and rapid mixing thermal energy exchange via direct contact. In the discussion below, air is used as the oxidant; however, other oxidants such as pure oxygen can be used in the process. Furthermore, the feedstock gas and combustible gas can comprise the same gas or gas mixture or can comprise different gases or gas mixtures. In some embodiments, the combustible gas may comprise a recycled gas mixture.

Figure 3:
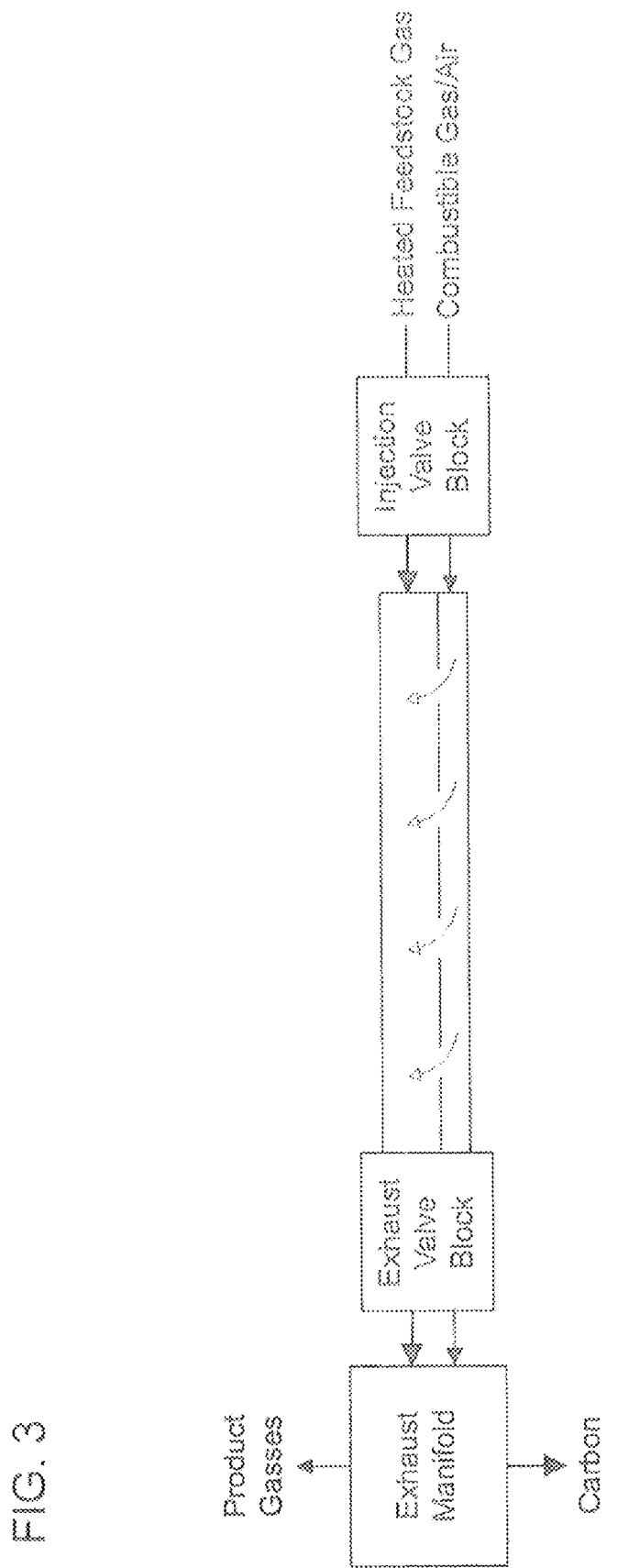
FIG. 3 is a schematic diagram of a system for cracking natural gas, according to embodiments of the disclosure.
Figure 4:
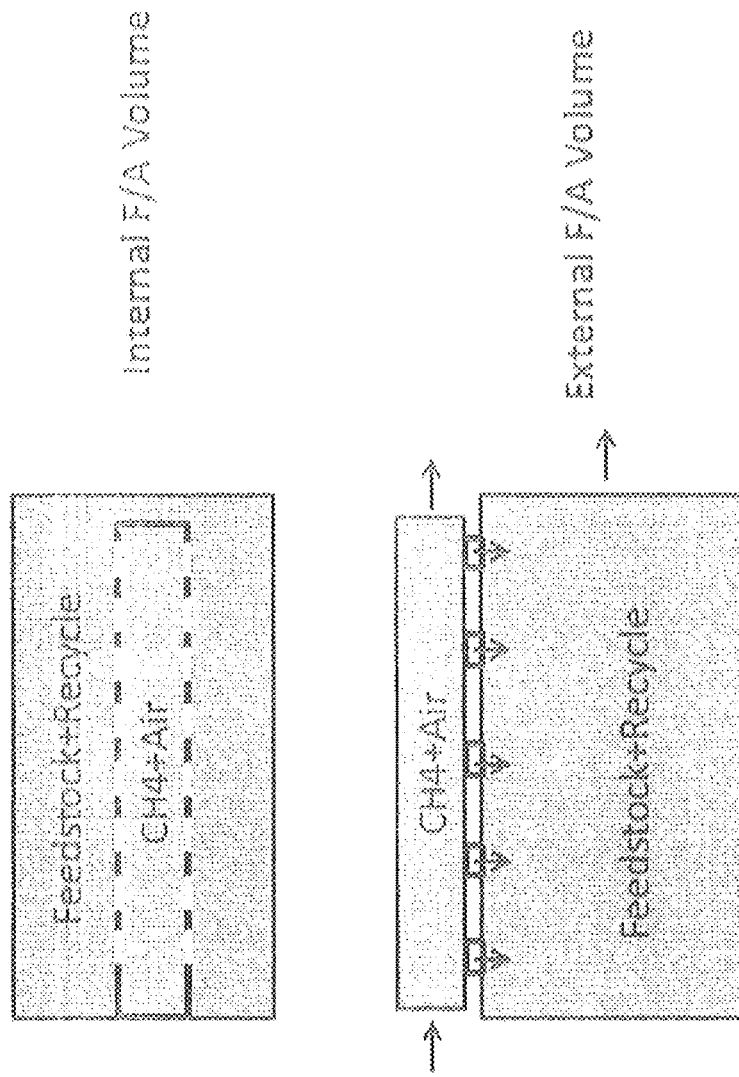
FIGS. 4A and 4B show different arrangements of a mixing chamber and a combustion chamber, according to embodiments of the disclosure.

The reactor comprises a mixing chamber and a combustion chamber. These chambers are connected via a number of passageways that are always open. In some embodiments, the reactor comprises a perforated tube (the combustion chamber) within a larger solid tube (the mixing chamber); see FIGS. 3 and 4A. In other embodiments, the combustion chamber can be external to the mixing chamber (as shown in FIG. 4B). External valves provide the feedstock, oxidant and combustible gas (shown as $CH_4$) as well as the discharged hydrogen, carbon and other gases produced during the reaction.

Figure 5:
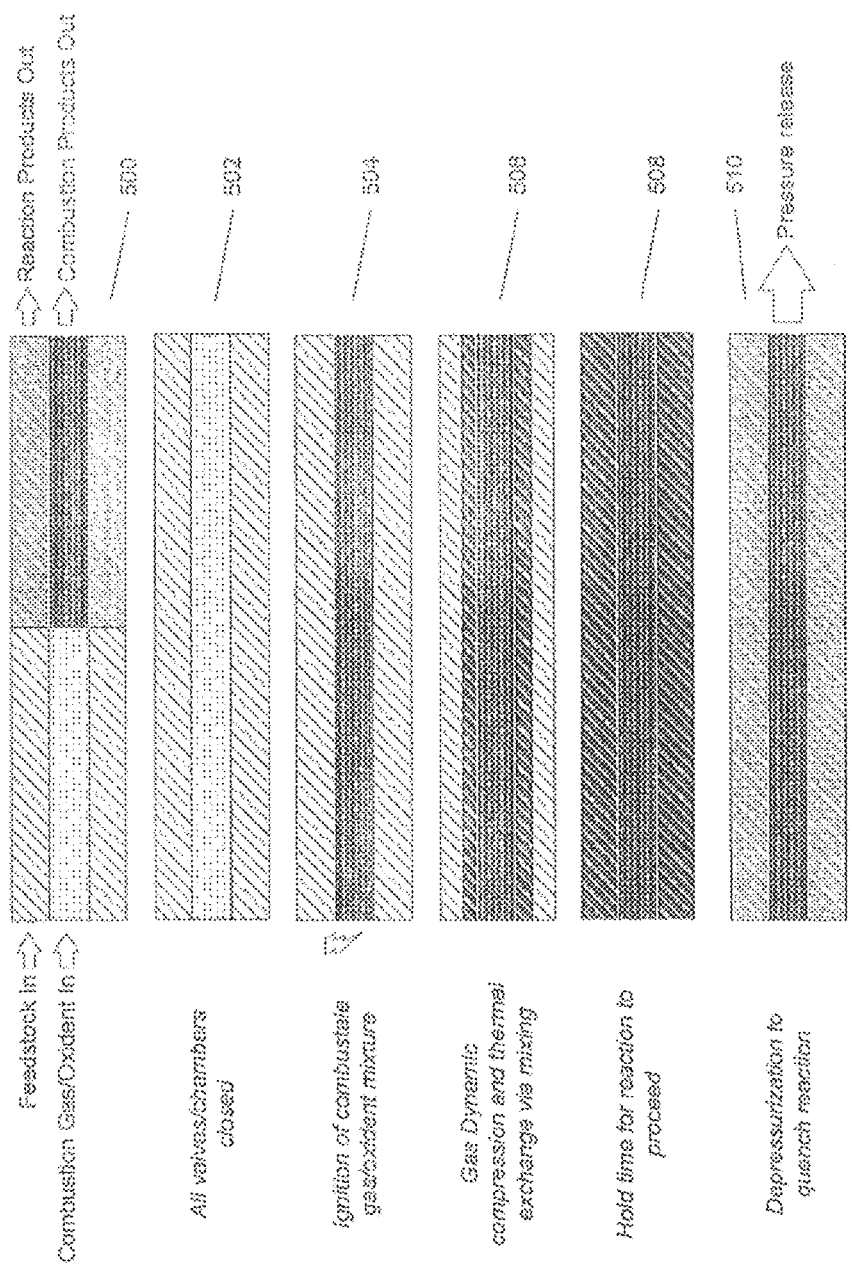
FIG. 5 is a schematic diagram of a method of cracking natural gas, according to embodiments of the disclosure.

Turning to FIG. 5, at the start of the cycle, the mixing chamber is filled with the products of the previous reaction cycle. The mixing chamber is filled with a mixture of products of the feedstock reaction plus a portion of the products of the combustion reaction. The combustion chamber is predominantly filled with the products of the combustion reaction. At 500, fresh feedstock and perhaps some recycled product gases are introduced into the mixing chamber to displace the products of the previous cycle from the end of the mixing chamber. At the same time, a combustible gas/air mixture is introduced into the combustion chamber, displacing the products of combustion from the end of the combustion chamber. At 502, all inlet and outlet valves are closed, creating a closed volume. At 504, the gases in the combustion chamber are then ignited resulting in a pressure and temperature increase within the combustion chamber. At 506, the passageways between the combustion chamber and the mixing chamber allow the combustible gas products to enter into the mixing chamber thereby compressing the feedstock gases and increasing their pressure and temperature. In addition, the hot combustion chamber gas products mix with the feedstock gases and thereby transfer their thermal energy to the feedstock gases, further increasing their temperature. The resulting temperature and pressure of the feedstock gases causes a reaction to occur. At 508, the reaction is allowed to proceed for a period of time to complete the desired reaction and develop the desired products. At 510, the pressure within the mixing chamber is rapidly lowered by releasing the products to an external volume (not shown). Combustion product gases remaining in the combustion chamber may be vented out with the mixing chamber gases or vented out separately though a dedicated port. The pressure reduction in the mixing chamber reduces the temperature and stops or quenches the reaction. This rapid depressurization and expansion also has the desirous effect of removing solid reaction products, such as carbon, from the reactor walls. In addition, the pressure wave generated from the combustion may strip carbon deposits from the reactor walls.

If the feedstock and combustible gases are premixed, the mixture may not ignite, as it is too rich. Therefore, the mixing chamber and combustion chamber are distinct and separate prior to ignition, such that no or preferably very little mixing occurs between the feedstock gas and the combustible gas.

Figure 1:
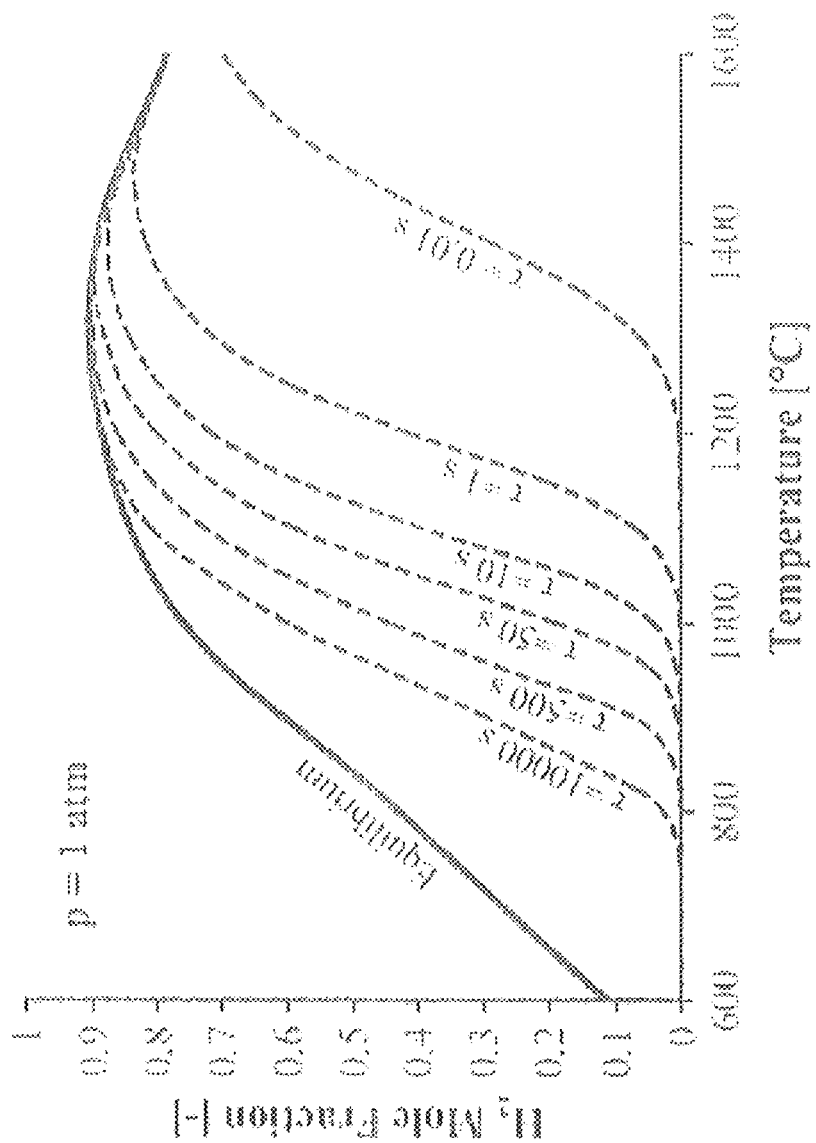
FIG. 1 is a graph of mole fraction of hydrogen created from methane at a pressure of 1 atmosphere under various temperatures and time constants.
Figure 2:
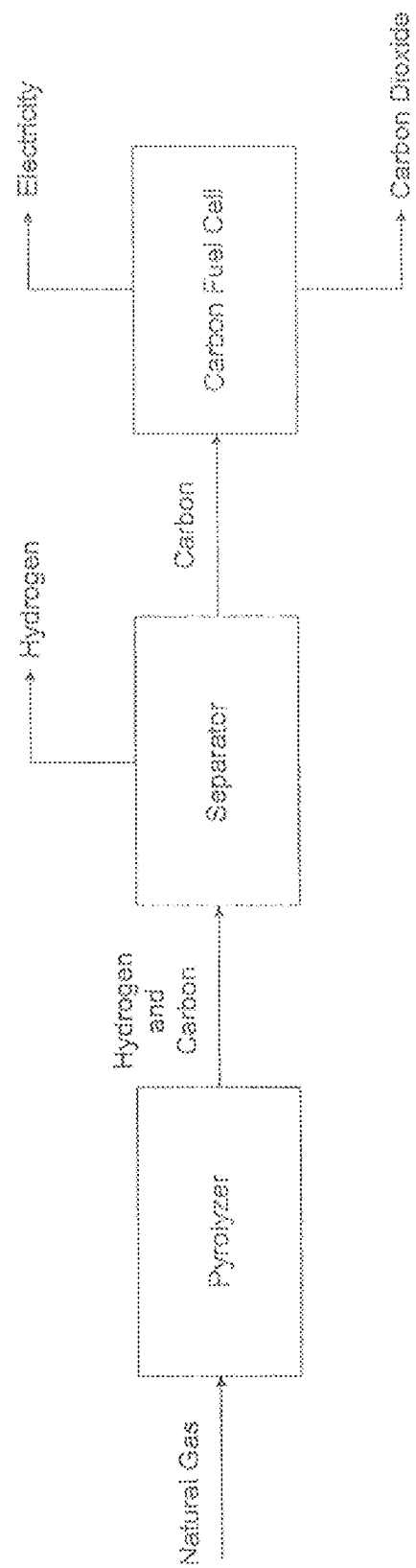
FIG. 2. shows a combination of natural gas dissociation and a carbon fuel cell for producing hydrogen, electricity and pure carbon dioxide, in accordance with embodiments of the disclosure.
Figure 6:
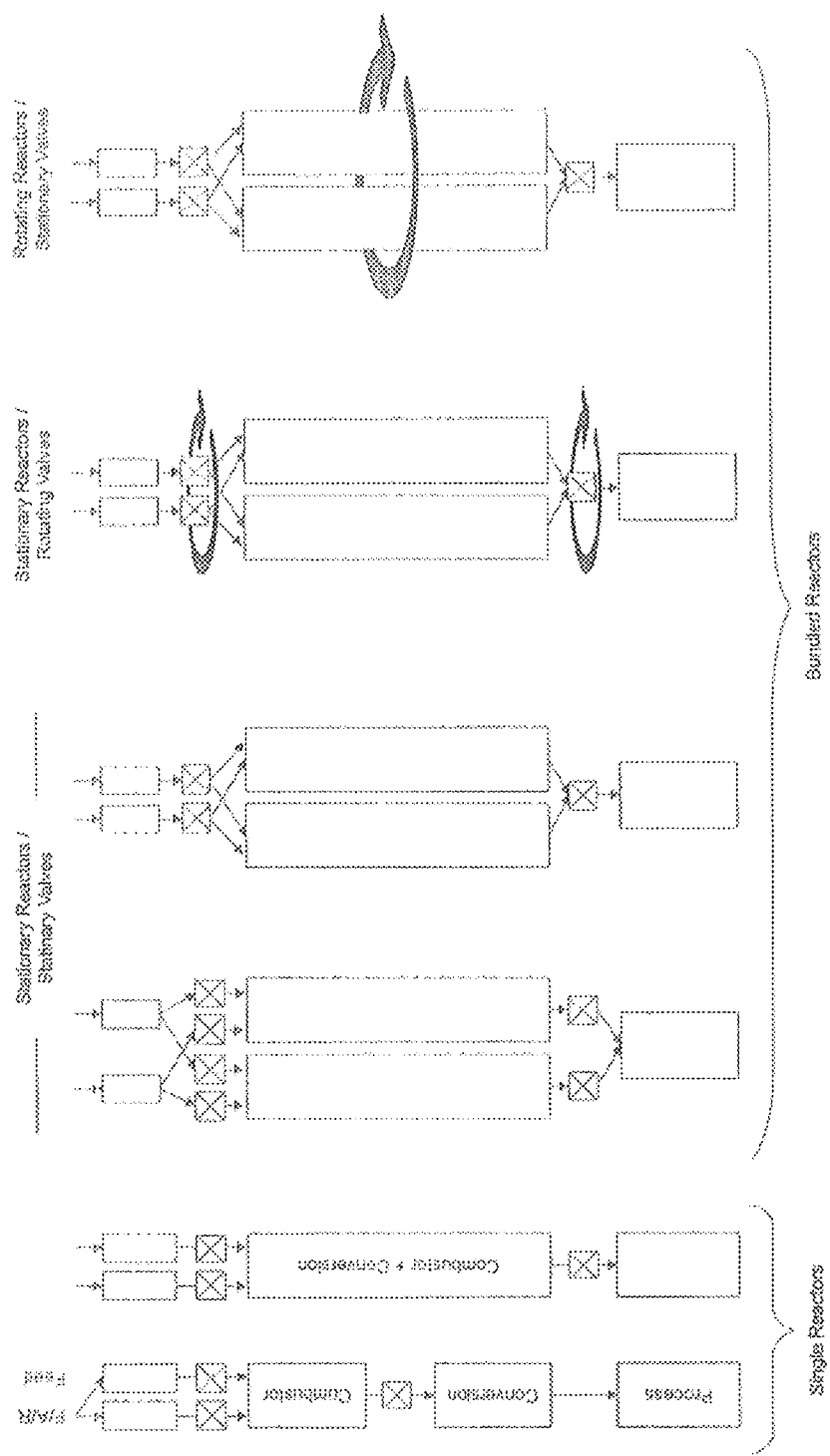
FIG. 6 shows different configurations of a system comprising bundled reactors operating out of phase, in accordance with embodiments of the disclosure.
Figure 7:
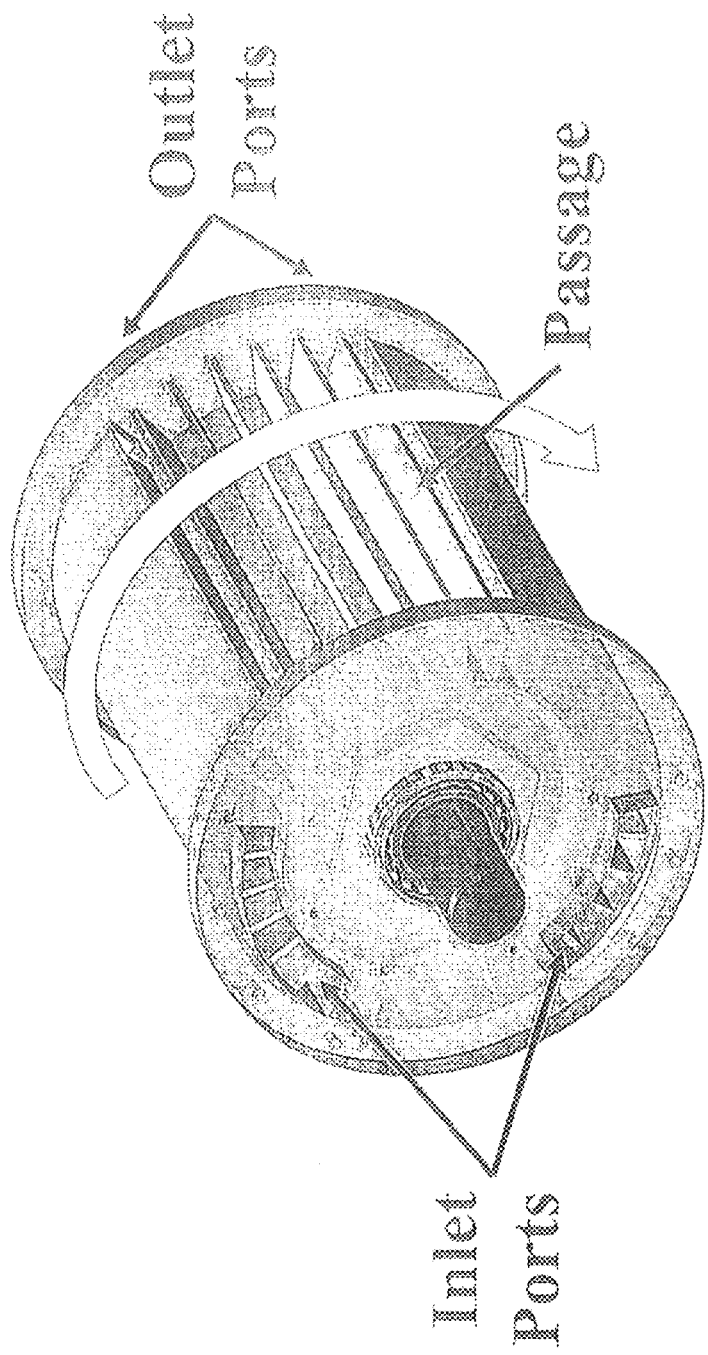
FIG. 7 shows bundled reactors rotating around stationary valves, in accordance with embodiments of the disclosure.

A number of reactor systems may be bundled together and operated slightly out of phase with each other to produce a continuous flow into and out of the reactor system. Valves can be stationary or rotating, as shown in FIG. 6. In some embodiment, the reactors can be rotated and the valves may remain stationary (see FIG. 7, modified from FIG. 2 of Wave rotor design method with three steps including experimental validation, Chan Shining et al., Journal of Engineering for Gas Turbines and Power, December 2017, the entirety of which is hereby incorporated by reference).

Various parameters may be adjusted to enable the reactor to work effectively. The feedstock gas may be preheated to just below the temperature at which it starts to react, before being introduced into the mixing chamber. A typical temperature would be in the range of 600K-1000K, depending on the feedstock components and working pressures.

Furthermore, the combustible gas/oxidant mixture being introduced may also be preheated before entering the combustion chamber. A typical temperature would be in the range of 400K-700 K depending on the combustible gases used. Preheating the combustible gas/oxidant mixture may improve the efficiency of the process such that more combustion energy is transferred to the reactants rather than being used to heat the products of combustion.

The volume ratio between the mixing chamber and combustion chamber should be set such that the correct amount of energy contained in the combustion chamber is provided to the mixing chamber to produce the desired products. There should also be sufficient combustible gas products entering the mixing chamber to provide effective mixing. A volume ratio of <10:1 is generally desired. When using air as the oxidant, nitrogen may be beneficial as a non-reactive gas that promotes a lower volume ratio and increases mixing. When using pure oxygen as the oxidant, another gas such as $CO_2$ may provide the same benefit as nitrogen in the air as oxidant case. Introducing additional $CO_2$ to the combustible gas mixture may result in greater solid carbon production.

The length-to-diameter ratio is important to obtain efficient energy transfer from the combustion chamber to the mixing chamber. Short, large-diameter reactors will tend to have poor mixing while long, skinny reactors will develop challenges in introducing the feedstock and combustible gases into the reactor along its length. A length-diameter ratio of <30:1 is generally desired.

Figure 13:
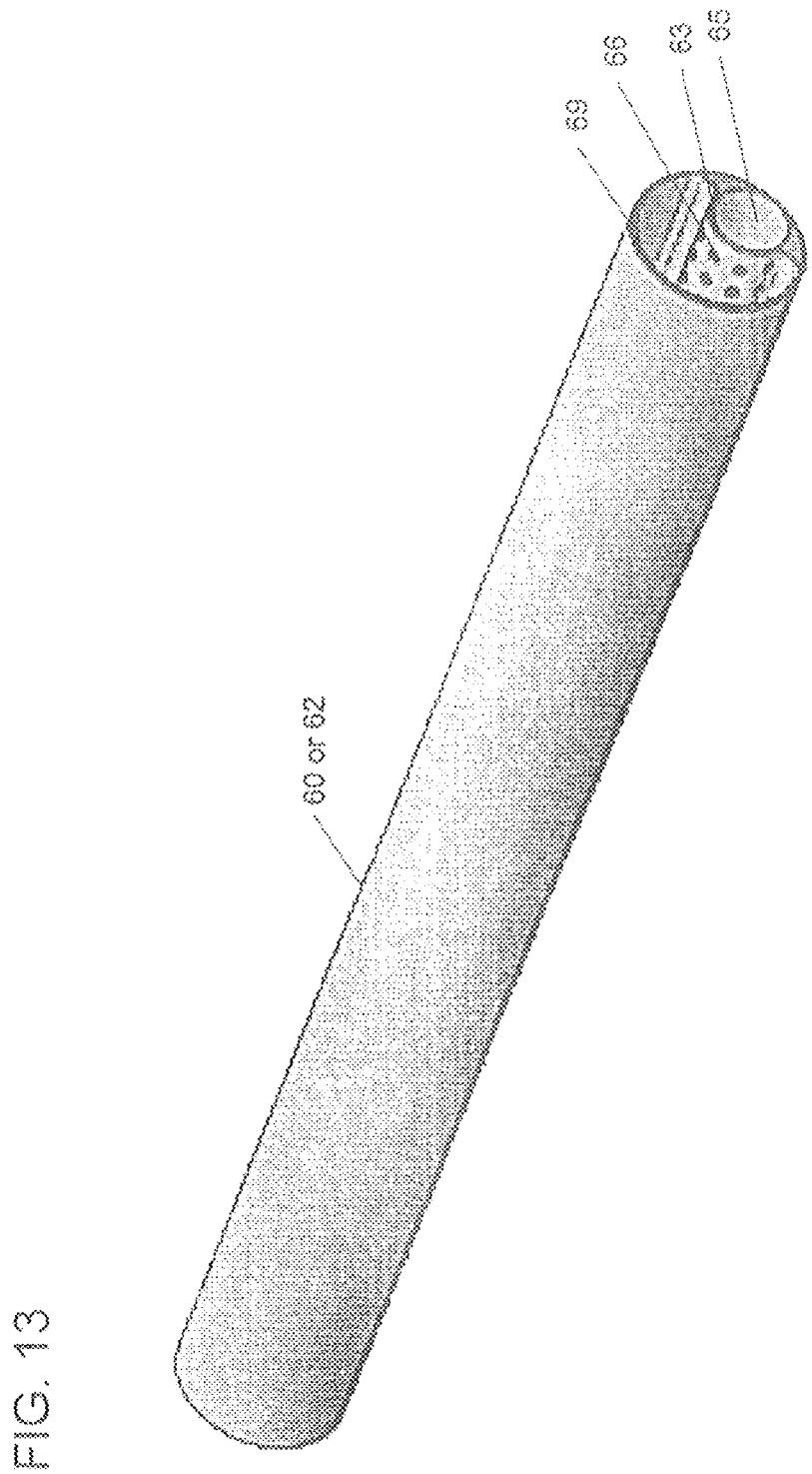
FIG. 13 shows a combustion chamber arranged within a mixing chamber, according to embodiments of the disclosure.

According to some embodiments, the reactor uses methane (or natural gas) in addition to some recycled product gases as the feedstock gas, and a recycled gas/oxidant mixture as the combustible gases. The reactor may be designed and operated to maximize the production of hydrogen and solid carbon in the reaction products stream. The reactor may comprise a combustion chamber, being a perforated tube, inside a mixing chamber. The perforated combustion chamber may be offset from the center of the mixing chamber and bonded to a wall of the mixing chamber to provide structural integrity and support, as can be seen in FIG. 13. The mixing chamber/combustion chamber volume ratio may be less than or equal 10:1 and the length-to-diameter ratio may be 10:1. In some embodiments the mixing chamber/combustion chamber volume ratio may be about 6:1, and in some embodiments the mixing chamber/combustion chamber volume ratio may be about 3.5:1.

Figure 14:
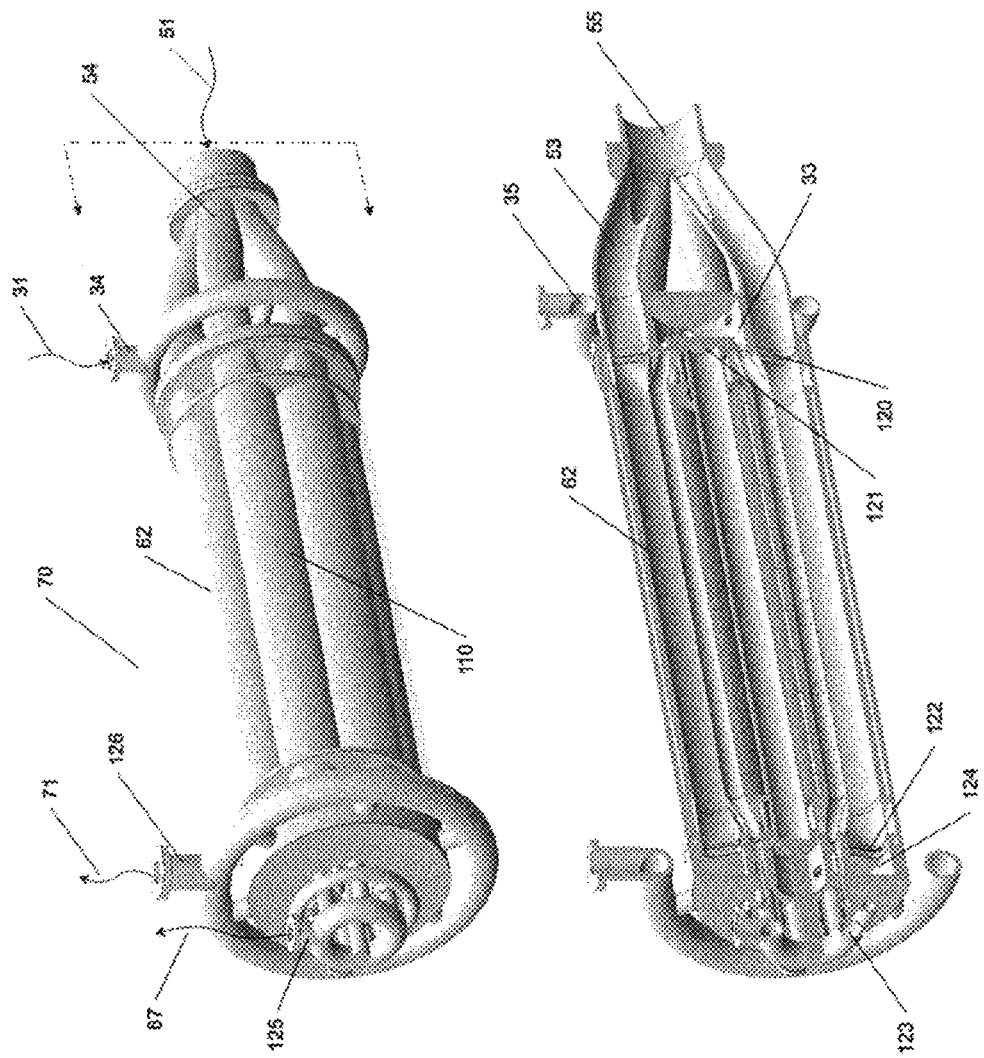
FIG. 14 shows a multi-reactor bundle with stationary reactors and rotating valves, according to embodiments of the disclosure.

As can be seen in FIG. 14, a number of reactor tubes may be arranged together with external rotating valves providing the flow and sequencing of all feedstock, combustible gases and reaction products. A separate port may vent the combustion chamber combustion products.

The reactor may be operated at a sufficiently high pressure such that the resulting hydrogen can be purified using standard pressure swing absorption technology. According to some embodiments, product gases such as unreacted methane (CH$_4$), carbon monoxide (CO) and some hydrogen are recycled and mixed with more methane to produce the feedstock gas mixture to the reactor. The combustible gas mixture comprises the recycled gas mixture in addition (in the case of an air-blown reactor) to the CO$_2$ removed from the CO$_2$ removal system, and pure oxygen. In some embodiments, the recycled gas mixture flowing to both the combustion and mixing chambers contains CO$_2$ in addition to CH$_4$, CO and H$_2$. The feedstock gas mixture and the combustible gas mixture are preheated to ~900K and ~600K respectively, from thermal energy recovered from the reactor products stream via a multi-stream heat exchanger. In alternative embodiments, the mixing chamber/combustion chamber volume ratio is 3.5:1, methane (or natural gas)/air mixture is used for the combustible gases.

There will now be provided a detailed description of embodiments of the disclosure.

Figure 8:
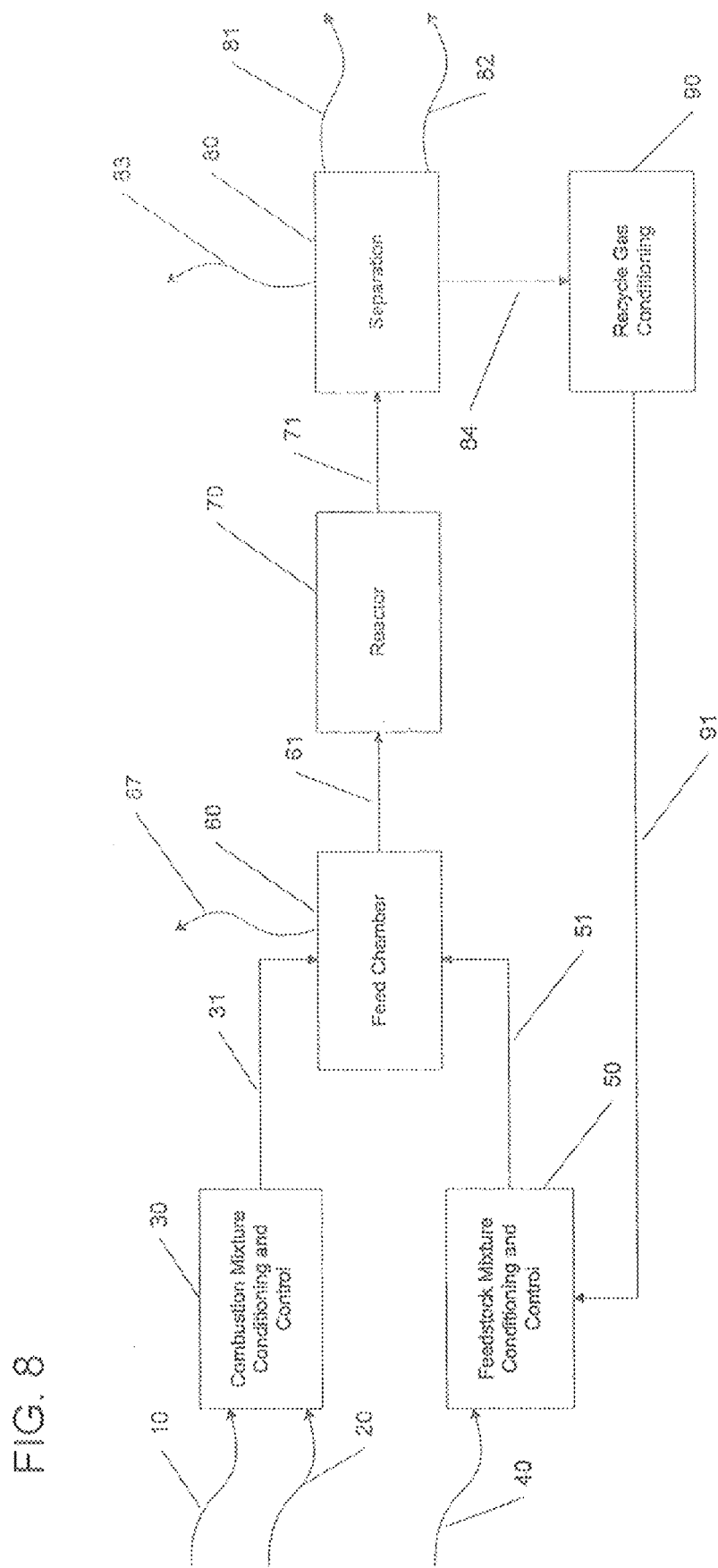
FIG. 8 is a schematic block diagram of a combustion chamber and a mixing chamber used to provide mixing of a feedstock gas with a combustible gas, and a third chamber to which the combustible and feedstock gas mixture is directed and in which one or more products are produced from the mixture, according to embodiments of the disclosure.

With reference to FIG. 8, combustible gas 10 and oxidant gas 20 enter the combustion mixture conditioning and control system 30 which conditions the combustible gas mixture 31 to the correct temperature and pressure required by chamber 60. Feedstock gas 40 and recycle gas mixture 91 enter the feedstock mixture conditioning and control system 50 which conditions the feedstock mixture 51 to the correct temperature and pressure required by chamber 60. In some embodiments, a recycle gas mixture is not available and only the feedstock gas 40 enters the feedstock mixture conditioning and control system 50.

Chamber 60 is a constant volume device which uses the combustion energy from the conditioned combustible gas mixture 31 to increase the pressure and temperature of the conditioned feedstock mixture 51 to a reaction ready level. A combustion product gas mixture 67 comprising mainly of the combustion products of combusted conditioned combustible gas mixture 31 may be vented from chamber 60. The reaction ready gas mixture 61 enters the reactor 70, whereby it remains until the gas mixture is converted in a constant volume endothermic reaction to the reacted product mixture 71. The constant volume reaction is an unsteady process which operates in a batch mode and requires control of flow timing. This is accomplished by flow control in conditioning systems 30, 50, and separation and control system 80.

The reacted product mixture 71 enters the product separation and control system 80 which stops the reaction in reactor 70 by reducing the pressure and temperature of the desired reacted product mixture 71 and separates and/or purifies the individual product components 81, 82, the unwanted products 83 and the recycle gas mixture 84. The recycle gas mixture 84 enters the pre-conditioning recycle gas system 90 where the recycle gas mixture 84 is pre-conditioned to the desired temperature and pressure and flows to the feedstock mixture conditioning and control system 50.

In some embodiments, the combustible gas 10 and the feedstock gas 40 are natural gas, and the oxidant gas 20 is air. The desired reaction in reactor 70 is methane pyrolysis generally given by the following equation:

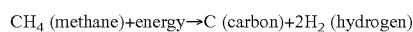

CH$_4$ (methane)+energy→C (carbon)+2H$_2$ (hydrogen)

The individual product 81 is hydrogen gas, the individual product 82 is carbon, and the unwanted products 83 are primarily carbon dioxide, nitrogen and water. The recycle gas mixture 84 comprises primarily of unreacted natural gas, hydrogen, nitrogen and carbon monoxide.

Figure 9:
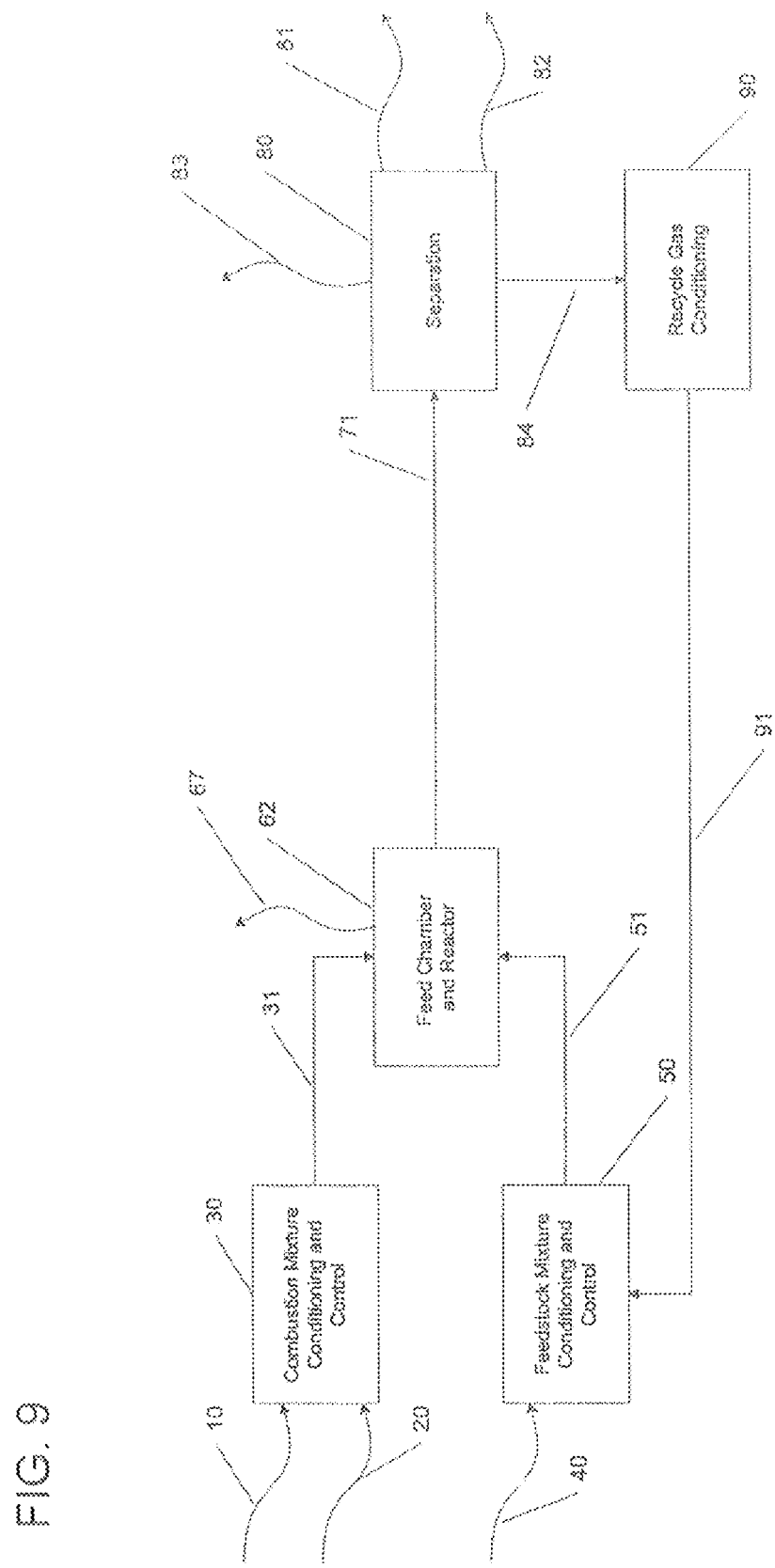
FIG. 9 is a schematic block diagram of a combustion chamber and a mixing chamber used to provide mixing of a feedstock gas with a combustible gas, and in which one or more products are produced from the mixture, according to embodiments of the disclosure.

The system in FIG. 9 is similar to that of FIG. 8 with the exception that the chamber 60 and the reactor 70 are combined into the constant volume reactor 62.

Figure 10:
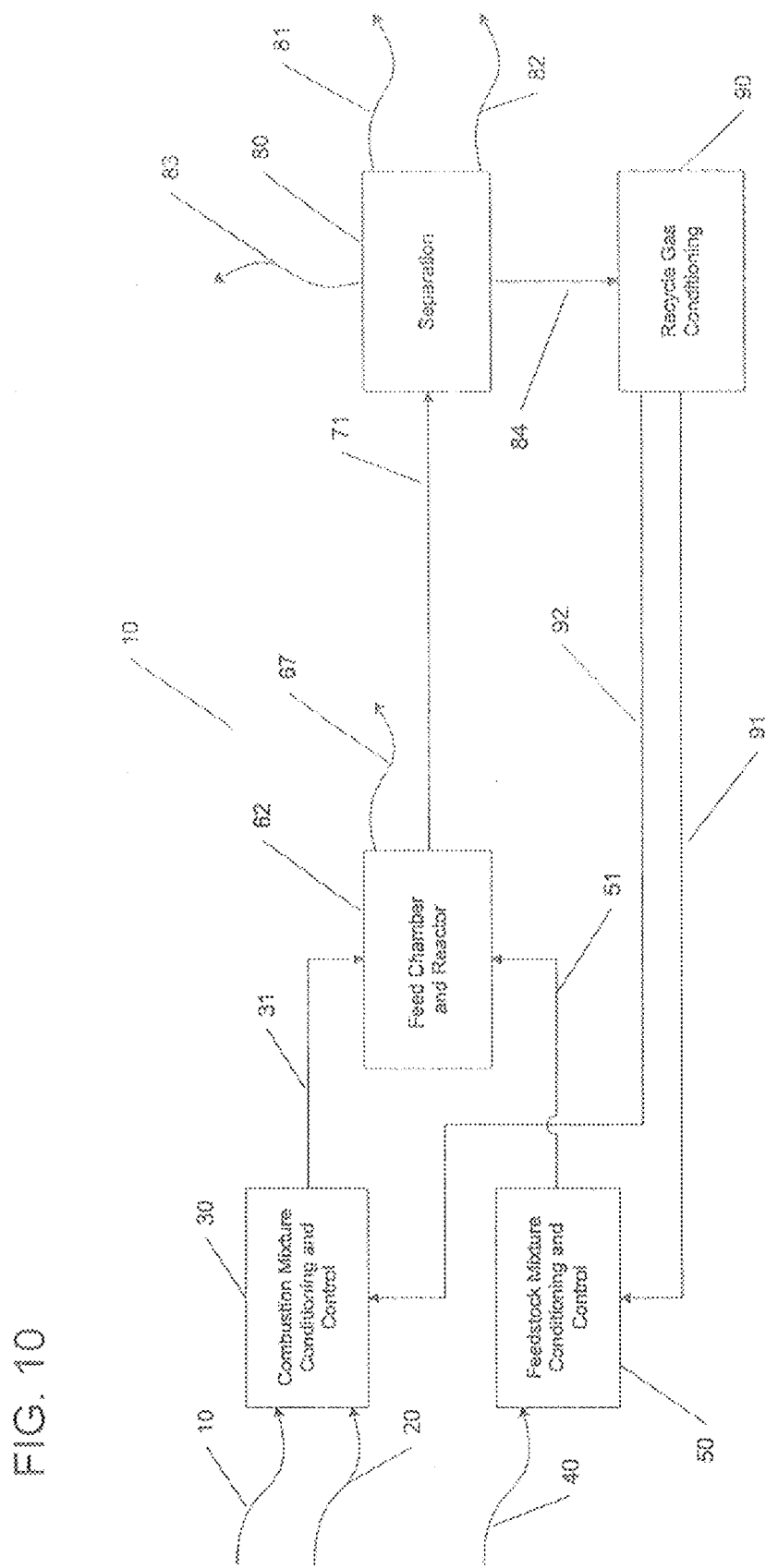
FIG. 10 is a schematic block diagram of a combustion chamber and a mixing chamber used to provide mixing of a feedstock gas with a combustible gas, and in which one or more products are produced from the mixture, and wherein recycled gases are used to provide thermal energy for the process, according to embodiments of the disclosure.

FIG. 10 is similar to FIG. 9 but with a portion of recycle mixture 84, conditioned in pre-conditioned recycled gas conditioner 90, sent to the combustible gas conditioner and control system 30 to offset the amount of combustible gas 10 required.

Figure 11:
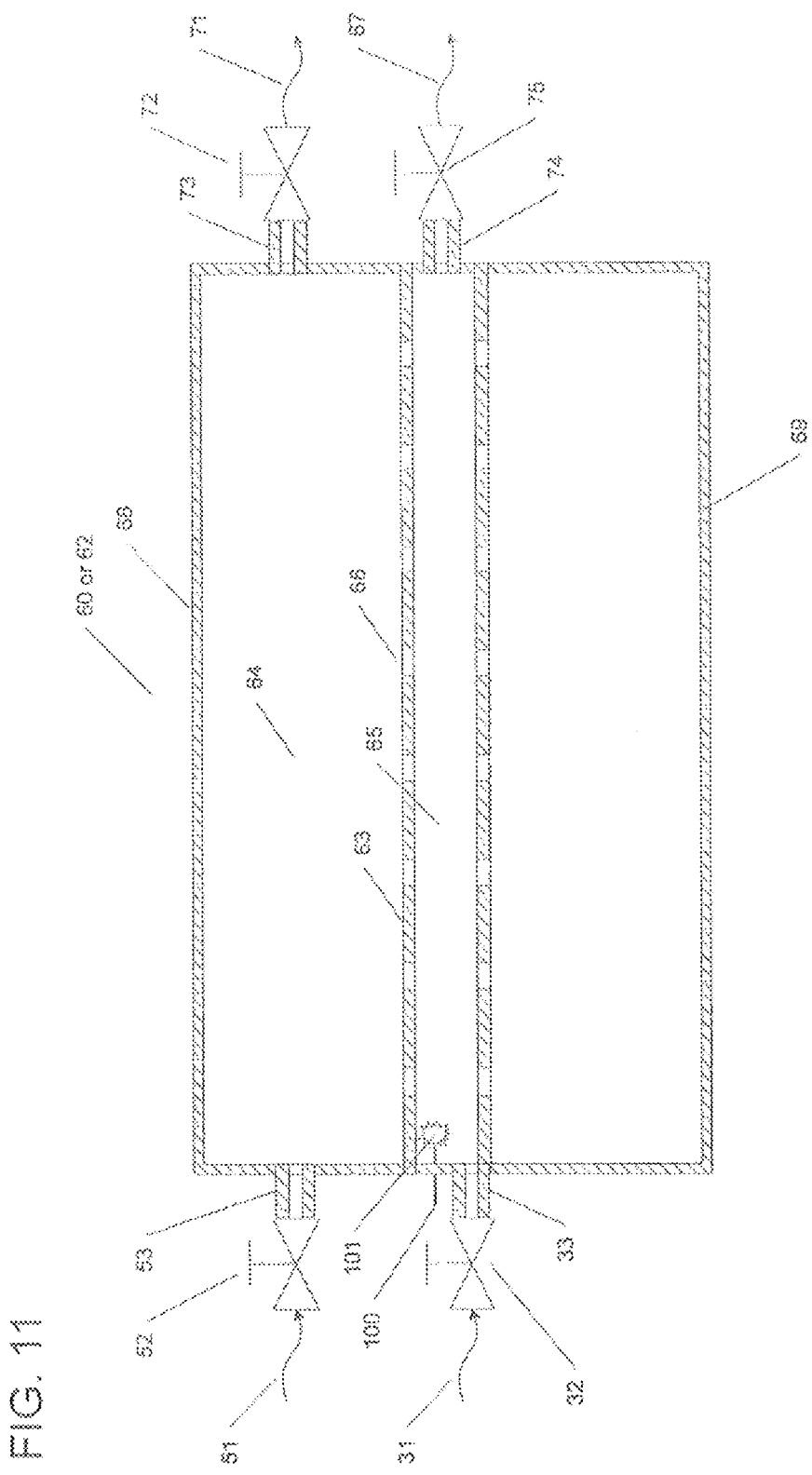
FIG. 11 is a schematic diagram of a combustion chamber located within a mixing chamber, according to embodiments of the disclosure.

FIG. 11 represents a cross-sectional view of either chamber 60 or constant volume reactor 62. In this description, it represents constant volume reactor 62.

Constant volume reactor 62 comprises a combustion volume 65 contained within combustion chamber 63. Combustion chamber 63 is surrounded by reactor volume 64 which is contained in reactor chamber 68. Passageways 66 connect combustion volume 65 to reactor volume 64. Although combustion chamber 63 is shown in the center of reactor chamber 68, the combustion chamber 63 can be located anywhere in reactor chamber 68, including against the outside wall 69 of the reactor chamber 68.

Conditioned combustible gas mixture 31 enters combustion chamber 63 through combustible gas mixture valve 32 and passageway 33, displacing any combustion product gas mixture 67 present in combustion volume 65 out of reactor 62 via passageway 74 and combustion product valve 75. Conditioned feedstock gas mixture 51 enters mixing chamber 68 through feedstock gas mixture valve 52 and passageway 53, displacing desired reacted product mixture 71 in reactor volume 64 out of reactor 62 via passageway 73 and product valve 72. Both the conditioned combustible gas mixture 31 and the conditioned feedstock gas mixture 51 may simultaneously enter constant volume reactor 62 at the same pressure such that there is very little mixing via passageways 66.

Once predominantly all the combustible gas mixture 67 and desired product mixture 71 is displaced from reactor 62, combustion product valve 75 and product valve 72 are closed. Once the desired reactor pressure is reached, combustible gas mixture valve 32 and feedstock gas mixture valve 52 are closed, creating a closed volume in reactor 62. Igniter 100 creates ignition energy 101 which allows conditioned combustible gas mixture 31 in combustion chamber 63 to combust in an exothermic reaction creating combustion product gas mixture 67 at elevated temperature and pressure. Due to the resulting pressure difference between combustion chamber 63 and mixing chamber 68, a portion of combustible gas mixture 67 enters reactor volume 64, compressing feedstock gas mixture 51 to a higher pressure. Simultaneously, this portion of hot combustible gas mixture 67 mixes and heats feedstock gas mixture 51 by conduction, convection and radiation. Feedstock gas mixture 51 is now at an elevated temperature and pressure which creates the conditions for an endothermic reaction to occur. Constant volume reactor 62 is maintained as a closed volume until the endothermic reaction proceeds long enough to create desired product mixture 71. Once this condition is reached, product valve 72 and combustion product valve 75 are opened which drops the pressure and temperature, stopping the endothermic reaction. The process then repeats.

Figure 12:
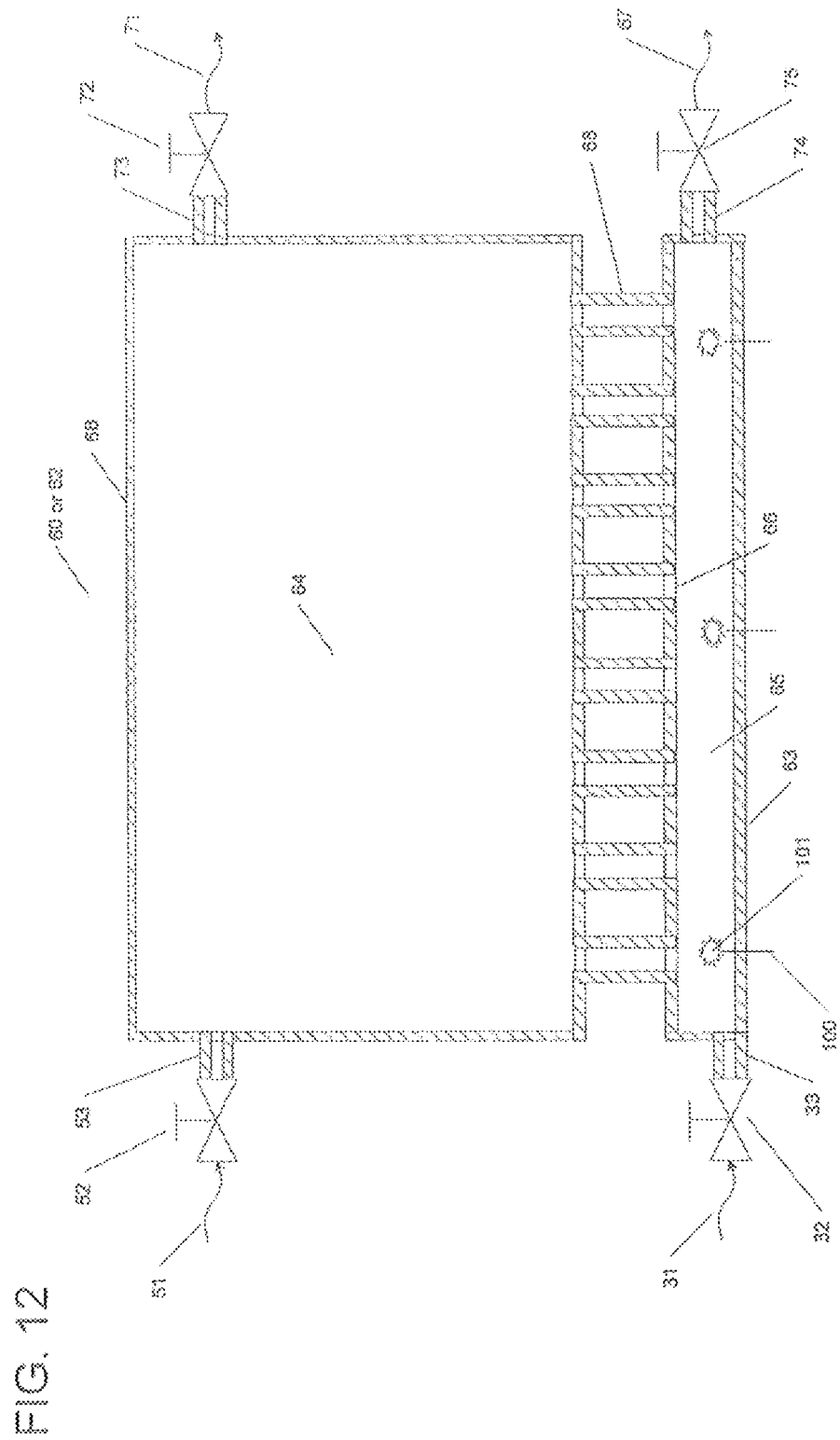
FIG. 12 is a schematic diagram of a combustion chamber located outside a mixing chamber, according to embodiments of the disclosure.

FIG. 12 shows an embodiment of chamber 60 or constant volume reactor 62 with combustion chamber 63 external to mixing chamber 68. Combustion volume 65 is connected to reactor volume 64 via a number of passages 68. Multiple ignitors can be positioned along combustion chamber 63 to create specific combustion conditions if required. Multiple ignitors can also be positioned in the constant volume reactor 62 of FIG. 11 if the combustion chamber 63 is positioned next to reactor chamber wall 69.

FIG. 13 shows an isometric view of an embodiment of chamber 60 or constant volume reactor 62 with the combustion chamber 63 directly bonded with the reactor chamber wall 69 of reactor chamber 68. Directly bonding combustion chamber 63 to reactor chamber wall 69 provides structural support and alignment to combustion chamber 63, and essentially creates a one-piece chamber 60 or constant volume reactor 62.

In order to create a quasi or semi-continuous flow system, multiple chambers 60 or constant volume reactors 62 can be arranged together and operated out of phase such that each chamber or reactor is undergoing a different part of the process described in FIG. 11.

FIG. 14 shows an embodiment of a multi-tube reactor 110, with a multitude of individual constant volume reactors 62 shown in FIG. 14 arranged in a circular pattern. Conditioned combustible gas mixture 31 enters multitube reactor 110 via passageway 34 into plenum 35. Conditioned feedstock gas mixture 51 enters multitube reactor 110 via passageway 54 into plenum 55. Timing of conditioned combustion and conditioned feedstock gas mixtures entering multitube reactor 110 is controlled by inlet rotating valve 120 which is part of rotating valve assembly 121. Inlet rotating valve 120 performs the same function as combustible gas mixture valve 32, passageway 33, feedstock gas mixture valve 52, and passageway 53 described in FIG. 11. The timing of combustion product gas mixture 67 and desired product mixture 71 leaving multitube reactor 110 is controlled by outlet rotating valve 122 which is part of rotating valve assembly 121. Outlet rotating valve 122 performs the same function as combustion product valve 72, passageway 73, feedstock product valve 75, and passageway 74 described in FIG. 11.

Combustion product gas mixtures 67 from each constant volume reactor 62 is collected in combustion product plenum 123 and distributed out of the multitube reactor 110 via passageway 125. Product mixture 71 from each constant volume reactor 62, is collected in product plenum 124 and distributed out of the multitube reactor 110 via passageway, 126.

While the disclosure has been presented primarily in the context of the cracking of a feedstock gas, the disclosure extends to other methods of producing one or more products from a feedstock gas. For example, syngas ($H_2$ and CO) may be produced by adjusting one or more parameters of the process such that the combustible gas reacts (in addition to mixing) with the feedstock gas. For instance, the ratio of oxidant to recycled gas in the combustible gas may be increased, to increase the pressure and temperature of the combustible gas immediately after ignition, and thereby induce an appropriate reaction between the combustible gas and the feedstock gas.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

The invention claimed is:

1. A method of decomposing a feedstock gas in a feedstock gas reactor, comprising:

introducing the feedstock gas into a mixing chamber of the feedstock gas reactor;

introducing a combustible gas into a combustion chamber of the feedstock gas reactor, wherein the combustion chamber is connected to the mixing chamber;

combusting the combustible gas in the combustion chamber so as to form one or more combustion product gases, wherein the one or more combustion product gases flow into the mixing chamber and mix with the feedstock gas, and wherein, as a result of the mixing of the one or more combustion product gases with the feedstock gas, energy is transferred from the one or more combustion product gases to the feedstock gas and thereby causes a chemical reaction to decompose the feedstock gas and produce one or more reaction products;

extracting a mixed product stream, comprising the one or more reaction products, from the mixing chamber; and recycling at least a portion of the mixed product stream to the feedstock gas reactor.

2. The method of claim 1, wherein:

the mixed product stream comprises carbon; and the method further comprises separating at least some of the carbon from the mixed product stream.

3. The method of claim 1, wherein:

the mixed product stream comprises hydrogen; and the method further comprises separating at least some of the hydrogen from the mixed product stream.

4. The method of claim 3, wherein separating the hydrogen comprises using pressure swing adsorption.

5. The method of claim 1, wherein:

the mixed product stream comprises carbon and hydrogen; and recycling the at least a portion of the mixed product stream comprises:

separating at least some of the carbon and at least some of the hydrogen from the mixed product stream to form a recycled gas mixture; and recycling the recycled gas mixture to the feedstock gas reactor.

6. The method of claim 5, wherein recycling the recycled gas mixture comprises:

conditioning the recycled gas mixture to a desired temperature and pressure; and recycling the conditioned recycled gas mixture to the feedstock gas reactor.

7. The method of claim 5, wherein recycling the recycled gas mixture comprises:

mixing a first fraction of the recycled gas mixture with an oxidant;

mixing a second fraction of the recycled gas mixture with a source of the feedstock gas; and recycling the mixture of the oxidant and the first fraction of the recycled gas mixture, and the mixture of the feedstock gas and the second fraction of the recycled gas mixture, to the feedstock gas reactor.

8. The method of claim 7, wherein the first and second fractions sum to 1.

9. The method of claim 7, wherein recycling the mixtures comprises:

introducing the mixture of the oxidant and the first fraction of the recycled gas mixture into the combustion chamber; and introducing the mixture of the feedstock gas and the second fraction of the recycled gas mixture into the mixing chamber.

10. The method of claim 9, wherein introducing the mixture of the oxidant and the first fraction of the recycled gas mixture into the combustion chamber comprises:
   conditioning the mixture of the oxidant and the first fraction of the recycled gas mixture to a desired temperature and pressure; and
   introducing the conditioned mixture into the combustion chamber.

11. The method of claim 9, wherein introducing the mixture of the feedstock gas and the second fraction of the recycled gas mixture into the mixing chamber comprises:
   conditioning the mixture of the feedstock gas and the second fraction of the recycled gas mixture to a desired temperature and pressure; and
   introducing the conditioned mixture into the mixing chamber.

12. The method of claim 1, wherein combusting the combustible gas comprises igniting the combustible gas.

13. The method of claim 1, wherein the feedstock is decomposed in a constant-volume reaction process.

14. A system comprising:
   feedstock gas reactor comprising:
      a mixing chamber;
      a combustion chamber connected to the mixing chamber; and
      at least one igniter;
   valving for controlling flow of gases into and out of the mixing chamber and the combustion chamber; and
   a controller operable to:
      control the valving to introduce a feedstock gas into the mixing chamber;
      control the valving to introduce a combustible gas into the combustion chamber;
      control the at least one igniter to combust the combustible gas in the combustion chamber so as to form one or more combustion product gases, wherein the one or more combustion product gases flow into the mixing chamber and mix with the feedstock gas, and wherein, as a result of the mixing of the one or more combustion product gases with the feedstock gas, energy is transferred from the one or more combustion product gases to the feedstock gas and thereby causes a chemical reaction to decompose the feedstock gas and produce one or more reaction products;
      control the valving to extract a mixed product stream, comprising the one or more reaction products, from the mixing chamber; and
      control the valving to recycle at least a portion of the mixed product stream to the feedstock gas reactor.

15. The system of claim 14, wherein:
   the mixed product stream comprises carbon and hydrogen;
   the system further comprises a carbon separator and a hydrogen separator for separating at least some of the carbon and at least some of the hydrogen from the mixed product stream to form a recycled gas mixture; and
   the controller is further operable to control the valving to recycle the recycled gas mixture to the feedstock gas reactor.

16. The system of claim 15, wherein the controller is further operable to control the valving to:
   mix a first fraction of the recycled gas mixture with an oxidant;
   mix a second fraction of the recycled gas mixture with a source of the feedstock gas; and
   recycle the mixture of the oxidant and the first fraction of the recycled gas mixture, and the mixture of the feedstock gas and the second fraction of the recycled gas mixture, to the feedstock gas reactor.

17. The system of claim 16, wherein the first and second fractions sum to 1.

18. The system of claim 16, wherein the controller is further operable to control the valving to:
   introduce the mixture of the oxidant and the first fraction of the recycled gas mixture into the combustion chamber; and
   introduce the mixture of the feedstock gas and the second fraction of the recycled gas mixture into the mixing chamber.

19. The system of claim 18, wherein:
   the system further comprises a combustion mixture conditioning and control system for conditioning the mixture of the oxidant and the first fraction of the recycled gas mixture to a desired temperature and pressure; and
   the controller is further operable to control the valving to introduce the conditioned mixture into the combustion chamber.

20. The system of claim 18, wherein:
   the system further comprises a feedstock mixture conditioning and control system for conditioning the mixture of the feedstock gas and the second fraction of the recycled gas mixture to a desired temperature and pressure; and
   the controller is further operable to control the valving to introduce the conditioned mixture into the mixing chamber.

* * * * *